Patented Dec. 9, 1941

2,265,194

UNITED STATES PATENT OFFICE 2,265,194

PROCESS FOR THE PRODUCTION OF CAPILLARY-ACTIVE WATER-SOLUBLE CONDENSATION PRODUCTS

Bruno v. Reibnitz, Mannheim, and Max Neber, Ludwigshafen-on-the-Rhine, Germany, assignors, by mesne assignments, to General Aniline & Film Corporation, New York, N. Y., a corporation of Delaware No Drawing. Application July 21, 1938, Serial No. 220,504. In Germany July 23, 1937

2 Claims. (Cl. 260—458)

The present invention relates to a process of producing capillary-active water-soluble condensation products from higher-molecular ketones.

We have found that valuable capillary-active water-soluble condensation products can be prepared by introducing alkyleneoxy or polyalkyleneoxy radicles in ketones of the general formula $R_1—CO—R_2$, in which $R_1$ and $R_2$ are saturated or unsaturated aliphatic, cycloaliphatic, aromatic, aliphatic-cycloaliphatic, aliphatic-aromatic or heterocyclic radicles containing from 5 to 11 carbon atoms. Ketones of the kind are for example hexyl-heptyl ketone, dioctyl ketone, isoheptyl-octyl ketone, diisooctyl ketone or hexylene-nonyl ketone, furthermore dicyclohexyl ketone, benzophenone, dibenzyl ketone, hexylphenyl ketone and dipyridine ketone.

Suitable initial materials for the said process are for example the dehydrogenation products, from secondary alcohols containing from 11 to 23 carbon atoms in the molecule particularly such alcohols the hydroxy group of which is situated in the middle or near the middle of the carbon-chain. Furthermore ketones as are obtained by condensing ketones with aldehydes for example by condensing one molecular proportion of acetone with 2 molecular proportions of hexyl or heptyl aldehyde and, if desired, hydrogenating the double bonds contained in these condensation products can be advantageously employed as starting materials. Also ketones as are obtained by heating the calcium salts of carboxylic acids containing from 6 to 12 carbon atoms or by heating the said carboxylic acids in the presence of catalysts which favor the splitting off of $CO_2$ may be employed. Very suitable initial materials are ketones or mixtures thereof which are obtainable by ketonization of carboxylic acids containing from 6 to 12 carbon atoms in the molecule which are formed by oxidizing high-molecular non-aromatic hydrocarbons, oils, fats or waxes.

The introduction of the alkyleneoxy or polyalkyleneoxy chains (i. e. chains of the formula $—(O—A)_n—OH$, wherein A is an alkylene radicle and $n$ means an integral number) into the said initial materials is effected for example preferably by the action of alkylene oxides, such as ethylene oxide, propylene oxide, butylene oxide or glycide, on the carbonyl compounds. It is preferable to work in closed vessels and also with the addition of catalytic substances, such as caustic potash, caustic soda, soda, potash, sodium ethylate, bleaching earths or active carbon. Solvents or diluents, which themselves do not react with the alkylene oxides, as for example hydrocarbons, chlorohydrocarbons, ethers or esters, may also be used in the reaction. Ordinary or elevated temperature, and if desired increased pressure, may be used.

The introduction of the polyalkyleneoxy chains may also be effected in other ways, as for example by condensation of the said carbonyl compounds with polyglycol compounds containing reactive groups, as for example triethylene glycol mono sulphuric acid ester or the monochlor compound of tetra-ethylene glycol.

The compounds present in the reaction product which have not reacted with the alkylene oxides or the like may be readily removed, for example by extraction of the reaction products with organic solvents, for example with aliphatic hydrocarbons or chlorinated aliphatic hydrocarbons and water-soluble alcohols.

The compounds containing polyalkyleneoxy radicles thus obtained are readily soluble in water or readily dispersable therein and have strong capillary-active properties, in particular a high wetting, foaming, dispersing and washing power; they may therefore be used with advantage in wetting, washing, dyeing, printing and the like in the textile, leather, paper and rubber industries. The products which contain no acid groups have the valuable property of not changing dyestuffs and also of not forming undesirable deposits with the substances forming the hardness of water or with salts.

Depending on the initial materials selected and the length of the hydroxy ether chains introduced into the same it is possible to influence the special properties of the products. For example from ketones having about 18 carbon atoms there are obtained by the introduction of polyglycol ether radicles having more than 12 $—C_2H_4—O—$ groups products having especially pronounced washing and emulsifying action, whereas by the introduction of polyglycol ether radicles having only 6 $—C_2H_4—O—$ groups into the same initial materials products are obtained having a pronounced high wetting power. By adding on about 2 molecules of ethylene oxide to ketones having about 14 carbon atoms and then sulphonating the hydroxyl groups situated at the end of the ether radicles, products can be obtained which are especially suitable in the form of their alkali salts for washing white goods.

The terminal hydroxyl groups contained in the hydroxy ether radicles are capable of further reactions with reactive groups. Thus acid or basic salt forming groups can be introduced into the compounds containing alkyleneoxy or polyalkyleneoxy radicles. For such reactions there may be mentioned in particular polybasic acids capable of forming esters, such as sulphuric acid, chlorsulphonic acid, oleum, phosphoric acid, oxalic acid, succinic acid, maleic acid, phthalic acid, sulphophthalic acid and chloracetic acid. The condensation is to be carried out under such conditions that the products contain at least one salt-forming group. The salts of these condensation products, for example the sodium salts, possess high capillary-active properties. The terminal hydroxyl groups may also be replaced by chlorine, as for example by treatment with phosphorus oxychloride or thionyl chloride, and the resulting chloro compounds condensed with amines. The products thus obtained may be used in the form of their salts with acids, such as hydrochloride acid or acetic acid, as textile assistants with advantage.

The products obtainable according to the said process may be used as such or together with other textile assistants, as for example soaps or soap-like substances, inorganic salts, such as soda, phosphates or waterglass, or together with organic solvents, bleaching earths or the like.

The following examples will further illustrate the nature of this invention but the invention is not restricted to these examples. The parts are by weight.

Example 1

Fatty acids having chains of a length of from about 6 to 10 carbon atoms, which are obtainable as first runnings in the distillation of the fatty acids obtained from the oxidation products of soft paraffin wax, are converted into ketones by heating in the presence of iron powder at about 250° C. After adding 1 per cent of sodium ethylate to 100 parts of the said ketone mixture, 315 parts of ethylene oxide are allowed to act thereon in a closed vessel at 150° C. There is thus obtained a waxy mass which is readily soluble in water. The aqueous solutions are completely stable to calcium salts; they have a good foaming, emulsifying and washing power.

Example 2

After adding 0.5 per cent of caustic soda to 100 parts of the ketone mixture described in Example 1, they are reacted in a closed vessel with 20 parts of ethylene oxide. The product is dissolved in the same weight of benzene and sulphonated at 20° C. with 36 parts of chlorsulphonic acid. After neutralization of the sulphonation mixture with aqueous caustic soda solution and evaporation, about 225 parts of a yellowish colored paste are obtained which constitutes a very good washing agent for white goods with a high dispersing power for calcium soap.

Example 3

Pelargonic acid is converted into the corresponding dioctyl ketone by passing it at 400 to 450° C. in vapor state over a catalyst containing thorium oxide. 260 parts of ethylene oxide are caused to act on 260 parts of the said ketone after the addition of 0.5 per cent of metallic sodium at 150° C. in a closed vessel. When the reaction is finished, 160 parts of phosgene are led into the polyglycol ether formed at a temperature from 20 to 50° C. thus forming the corresponding chlorocarbonic acid ester of the polyglycol ether. By introducing air into the reaction mixture phosgene and hydrogen chloride dissolved therein are removed.

The chlorocarbonic acid ester is then caused in an aqueous alkaline medium at normal temperature to act on 800 parts of an aqueous solution of the sodium salt of taurine of 15 per cent strength. By evaporating the solution obtained a paste is obtained which can be easily dissolved in water. The aqueous solution has a high washing and wetting power.

What we claim is:

1. The process of producing water-soluble condensation products which comprises causing an alkylene oxide to act on an aliphatic ketone of the formula $R_1—CO—R_2$, wherein $R_1$ and $R_2$ are aliphatic radicles containing from 5 to 11 carbon atoms obtained from carboxylic acids produced by oxidizing high-molecular aliphatic hydrocarbons.

2. The process of producing water-soluble condensation products which comprises causing an alkylene oxide to act on a ketone of the formula $R_1—CO—R_2$, wherein $R_1$ and $R_2$ are radicles selected from the class consisting of aliphatic, cyclo-aliphatic, aromatic, aliphatic-aromatic and heterocyclic radicles, containing from 5 to 11 carbon atoms and introducing into the reaction product a salt-forming group.

BRUNO v. REIBNITZ.
MAX NEBER.